July 28, 1925.

J. P. SHANNON

FISHING LURE

Filed Nov. 23, 1923

1,547,619

Witness:
Chas. P. Kursh.

Inventor,
Jesse P. Shannon,
By Offield Bulkley Poole & Scott.
Attys

Patented July 28, 1925.

1,547,619

UNITED STATES PATENT OFFICE.

JESSE P. SHANNON, OF LAKE GENEVA, WISCONSIN.

FISHING LURE.

Application filed November 23, 1923. Serial No. 676,491.

*To all whom it may concern:*

Be it known that I, JESSE P. SHANNON, a citizen of the United States, and a resident of Lake Geneva, in the county of Walworth and State of Wisconsin, have invented certain new and useful Improvements in Fishing Lures, of which the following is a specification.

This invention relates to a fishing lure or artificial bait especially designed for casting or trolling for game fish.

The object of the invention is to provide a lure consisting primarily of a hook and a bait secured thereto, preferably in the form of a strip of pork rind or the like.

A further object of the invention is to provide a novel and effective method of attaching the bait to the hook so that it can be easily and securely baited, and at the same time assume the most favorable position for simulating the naturally weaving or wriggling movement of live bait in traveling through the water.

In disclosing the invention, it is to be understood that a hook equipped with the attaching member may be used in making various forms of lures, such as flies, spoons and various other forms in which spinners, feathered or colored materials are employed to produce a life-like effect. An illustrative form of lure is disclosed herein, it being understood that the bare hook with the novel bait attaching device constitutes subject matter of the invention.

Referring to the accompanying drawings:—

Figure 1:
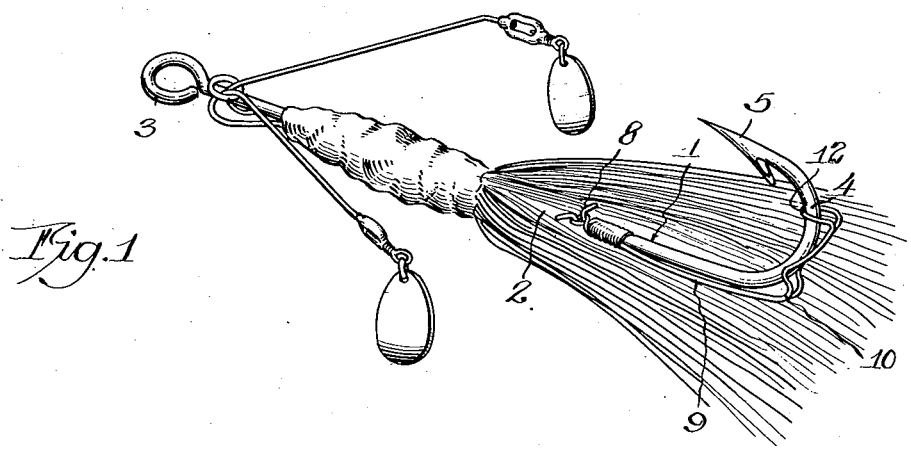
Figure 1 is a perspective view of a hook with a strip of pork rind secured in position.

Figure 1 shows a lure or artificial part in which the hook 1 forms the foundation, said hook being of the usual form, consisting of a straight shank 2 having an eye 3 at one end and the bent or hooked portion 4 at its other end with a barb 5 at its extremity.

Adjacent the lower end of the shank, and just above the point where the shank begins to bend to form the hook, is rigidly secured the attaching device consisting in general of a spring clip 6, preferably made of resilient wire, bent double to form a skeleton frame which conforms generally to the rounded contour of the curve at the base of the shank. The clip is secured near the lower end of the shank by means of a wrapping 7, of several turns of light wire wrapped about the end portions of the wires forming the clip, the extreme ends of said wires being brought together and twisted and its extremities thence extended laterally and in opposite directions to form prongs 8 which serve as an attaching member for the bait. Beyond the point of connection 7 the two parallel wires extend lengthwise of the shank, and spaced a short distance therefrom, and on what might be considered the back or outside of the hook, and forms an offset portion 9 which normally stands away from the shank. At the end of the straight or offset portion 9, the wires make an abrupt bend toward the hook, there being formed an intermediate U-shaped bend 10 between said offset portion 9 and a hook embracing portion 11, which follows substantially the curve at the base of the hook with the wires on either side thereof. At the extremity of the portion 11 of the clip, the wires are bent at right angles to form a U-shaped loop 12, which passes over or straddles the hook on the inside thereof.

Figure 2:
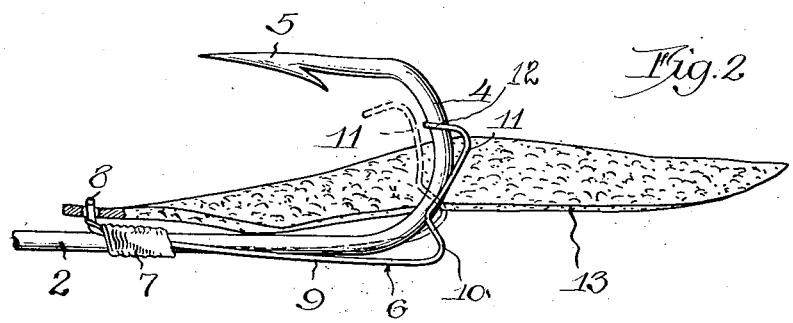
Figure 2 is an enlarged detail view in perspective, showing the manner in which the attaching member is applied and manipulated.

The clip is so applied as to be under tension and hence is yieldingly held in its normal position, as shown in full lines of Figure 2. By pressing inwardly upon the offset portion 9 the clip is displaced to the dotted line position of Figure 2, whereby the offset portion is brought into line with the shank of the hook and the end portion 11, shifted inwardly and free of the hook. This displacement of the end portion of the clip provides a slot or opening extending transversely of the hook, through which the bait, such as a strip of pork rind 13 may be inserted. The attachment of the strip 13 is accomplished by first inserting the prongs 8 through the inner end of the strip and then passing the free end through the eye formed by the clip, at the same time pressing inwardly with the finger. On releasing the clip it springs back to its initial position, thus securing the strip firmly against displacement, and in a position in the plane of the hook, it being obvious that the strip is turned through 90° in passing it through the eye of the clip. This is an added advantage in that the strip assumes a vertical position in the water, since a hook, particularly when forming a part of an artificial bait, invariably travels through the water with its barbed end uppermost. Thus the strip is capable of simulating more nearly the horizontal wriggling movement of a small fish in traveling through the water, rather than an unnatural up and down weaving or wriggling motion.

Figure 3:
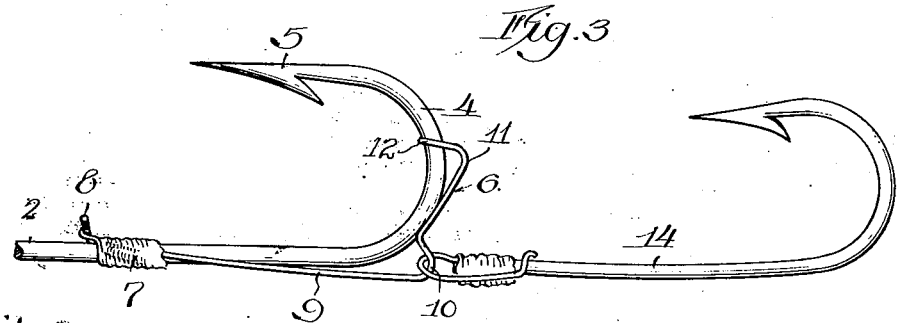
Figure 3 is an enlarged view showing the attaching member used for securing an additional hook.

The clip may also serve as a means for attaching an additional hook, if desired. The method of attachment is shown in Figure 3, in which the added hook 14 is secured to the U-shaped bend 10 at the base of the clip and trails the main hook. Any suitable means of connection may be used in attaching the trailing hook at the bend 10, which affords a convenient place of attachment, as well as a secured fastening.

Having described the features embodying the invention, I claim as my invention:

1. In a fishing lure, the combination of a hook, a spring clip consisting of parallel wires secured to the shank of the hook and extending on opposite sides of the lower portion of said shank and the curved portion of the hook therebeyond, the free end of said clip being bent transversely to form a U-shaped loop passing around the hook adjacent its barbed end, a portion of the clip intermediate its ends normally standing away from the hook to permit the clip to be depressed to permit the bait to be inserted through the end thereof.

2. In a fishing lure, the combination with a hook of a spring clip consisting of parallel wires, fixed to the shank and spaced apart to embrace a substantial portion of said shank and the curved portion therebeyond, and provided at its extremity with a looped end straddling said curved portion and having a portion intermediate its ends standing away from the hook and adapted to be pressed inwardly to permit the passage of the bait between the hook and the end portion of the clip.

3. In a fishing lure, the combination with a hook, of a clip consisting of wire bent to form a skeleton frame, conforming substantially to the curve at the lower end of the shank of the hook, said frame being secured to the shank with the ends of the wires projecting laterally to form bait securing prongs, and having a straight portion normally standing away from the shank portion and a free end portion extending transversely to said straight portion and embracing the hook beyond said bend, the extremity of said free end portion being bent inwardly to form a U-shaped loop straddling the hook.

In witness whereof, I hereunto subscribe my name this 19th day of November, A. D. 1923.

JESSE P. SHANNON.